US008219533B2

(12) United States Patent
Bennett

(10) Patent No.: US 8,219,533 B2
(45) Date of Patent: Jul. 10, 2012

(54) SEARCH ENGINE FEEDBACK FOR DEVELOPING RELIABLE WHOIS DATABASE REFERENCE FOR RESTRICTED SEARCH OPERATION

(75) Inventor: James D. Bennett, Hroznetin (CZ)

(73) Assignee: Enpulz LLC, Chicago, IL (US)

( * ) Notice: Subject to any disclaimer, the term of this patent is extended or adjusted under 35 U.S.C. 154(b) by 358 days.

(21) Appl. No.: 12/433,575

(22) Filed: Apr. 30, 2009

(65) Prior Publication Data

US 2009/0210417 A1    Aug. 20, 2009

Related U.S. Application Data

(63) Continuation-in-part of application No. 11/847,094, filed on Aug. 29, 2007.

(60) Provisional application No. 61/053,671, filed on May 16, 2008.

(51) Int. Cl.
*G06F 17/30* (2006.01)
(52) U.S. Cl. ......................................... 707/692; 707/706
(58) Field of Classification Search .................. 707/706, 707/781, 692
See application file for complete search history.

(56) References Cited

U.S. PATENT DOCUMENTS

| 6,745,248 B1 * | 6/2004 | Gardos et al. ................. 709/245 |
| 2002/0091827 A1 * | 7/2002 | King et al. ..................... 709/226 |
| 2002/0129013 A1 * | 9/2002 | Thomas ............................. 707/3 |
| 2007/0179848 A1 * | 8/2007 | Jain et al. ......................... 705/14 |
| 2007/0233808 A1 * | 10/2007 | Egnor et al. .................. 709/217 |
| 2008/0270203 A1 * | 10/2008 | Holmes et al. ..................... 705/7 |

OTHER PUBLICATIONS

Grossman, CAPTCHA Effectiveness Test, Sep. 2006.*

* cited by examiner

*Primary Examiner* — James Trujillo
*Assistant Examiner* — William Spieler
(74) *Attorney, Agent, or Firm* — Garlick & Markison; Bruce E. Garlick

(57) ABSTRACT

A system and method monitors and weeds out illegitimate/illegal websites during search engine indexing and domain name registration. The whois database generated during domain name registration is used as a reference database for correlation with a database generated by the search crawler on a search engine server. A whois analyzer from the search engine server extracts a set of URLs into a database called the uncorrelated URL database. The uncorrelated URL database contains those URLs from both the aggregate whois database and reverse index database after removing common URLs. The uncorrelated URLs are contacted and advised by the whois administrator to take necessary action to be listed in the whois database and properly be indexed during search engine crawling. This process ensures that every URL is properly registered and identified on the Internet thus eliminating the success of illegal/unwanted websites.

8 Claims, 9 Drawing Sheets

SEARCH ENGINE FEEDBACK FOR DEVELOPING RELIABLE WHOIS DATABASE REFERENCE FOR RESTRICTED SEARCH OPERATION

CROSS REFERENCES TO RELATED APPLICATIONS

The present application is a continuation-in-part of U.S. application Ser. No. 11/847,094, filed Aug. 29, 2007. The present application also claims priority under 35 U.S.C. 119(e) to U.S. Provisional Application Ser. No. 61/053,671, filed May 16, 2008, and having a common title with the present application, both of which are incorporated herein by reference in their entirety for all purposes.

BACKGROUND

1. Technical Field

The present invention relates generally to Internet search operations that facilitate Internet searches.

2. Related Art

Simple and short domain names are of high value to buy as they are easy to remember and type directly into network browser for browsing. A domain name is associated with lot of hard work and good will made by company or business firm in gaining the popularity and high value of their brand in the market. Internet squatters and scammers are always looking for these popular domain names. The squatters and scammers engage in unethical misuse of such popular names to divert legitimate Internet traffic to their website. It becomes important to impose disciplinary measures on such on-line conduct to safeguard the interest of the established domain names, businesses, and consumers for which a respective company has worked real hard to achieve a reputation and earn revenue from.

Current whois database servers maintained by their service providers do not provide any protection in safeguarding domain names for their owners. Normally, the records on the whois database servers are derived from the domain name registration system databases. If there is some incorrect record in the domain registration system database, it will be copied to whois database, as it is. Thus, such whois databases will merely become an aggregate of some reformatted records of registered information from a large number of domain name registration databases. Most often, it becomes very difficult or confusing to resolve identical domain names from multiple top-level domains. This is a misleading situation causing loss of business to genuine companies. Such undesirable incidents makes is to that the whois database server is needed accomplish various functionalities beyond what these structures were normally intended to accomplish.

Also, current whois database servers never distinguished between legal and illegal websites. Internet resources and databases will be of limited use if they are not used in large volume. Therefore, while providing access to harvest data in large volume the current whois database servers do not have protection against spammers misusing them. This issue is mainly due to lack of any built-in mechanism that could properly regulate different category of visitors to such whois database servers.

Whois database servers and search engine servers exist on the Internet as independent entities for different purposes and objectives. Current search engines do not perform operations other than searching, and the whois database servers serve only the purpose of facilitating the identification of business firms. Those search engines and whois database servers have never complemented each other or worked together to enhance the quality of various services to their customers.

Current search engines and whois database servers fail to differentiate between legal and illegal websites. Illegal websites are Internet squatters, scammers, and other sources or sites, who take undue advantage of misusing some reputed domain names, and also cause inconvenience to both legal and reputed companies as well as to customers on the Internet. The current search engines fail in identifying, containing, and thwarting unpopular websites, and stopping unwanted sites from appearing top in the search result lists through cautious search algorithms. Search engines with poor search algorithms can cause unwanted sites to appear early in search result lists, and inconvenience for both customers and legitimate business firms whose sites are then listed later on in search result lists. Search engines customers often search for the right products on line, but wind up buying inefficient, pirated, knock-off, imitation, or other products due to the presence of unwanted web squatters and scammers. In the meantime, genuine and honest business firms lose business to squatters and scammers.

Unwanted Internet traffic due to these abuses and during Internet search operations are never addressed by the Internet infrastructure. During the course of many Internet search operations, a lot of unwanted traffic due to squatters, scammers, etc. will be generated along with some genuine traffic. Such unwanted search results are undesirable at least for three main reasons: this causes unwanted traffic and operational costs on Internet causing inconvenience to millions of users and businesses; users fail to get their choice due to huge unwanted search result list being displayed on the screen causing confusion; and finally genuine and ethical companies lose business to unethical business firms on the Internet. Therefore, a need exists to handle these difficulties and challenges.

Further limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

DETAILED DESCRIPTION OF THE DRAWINGS

Figure 1:
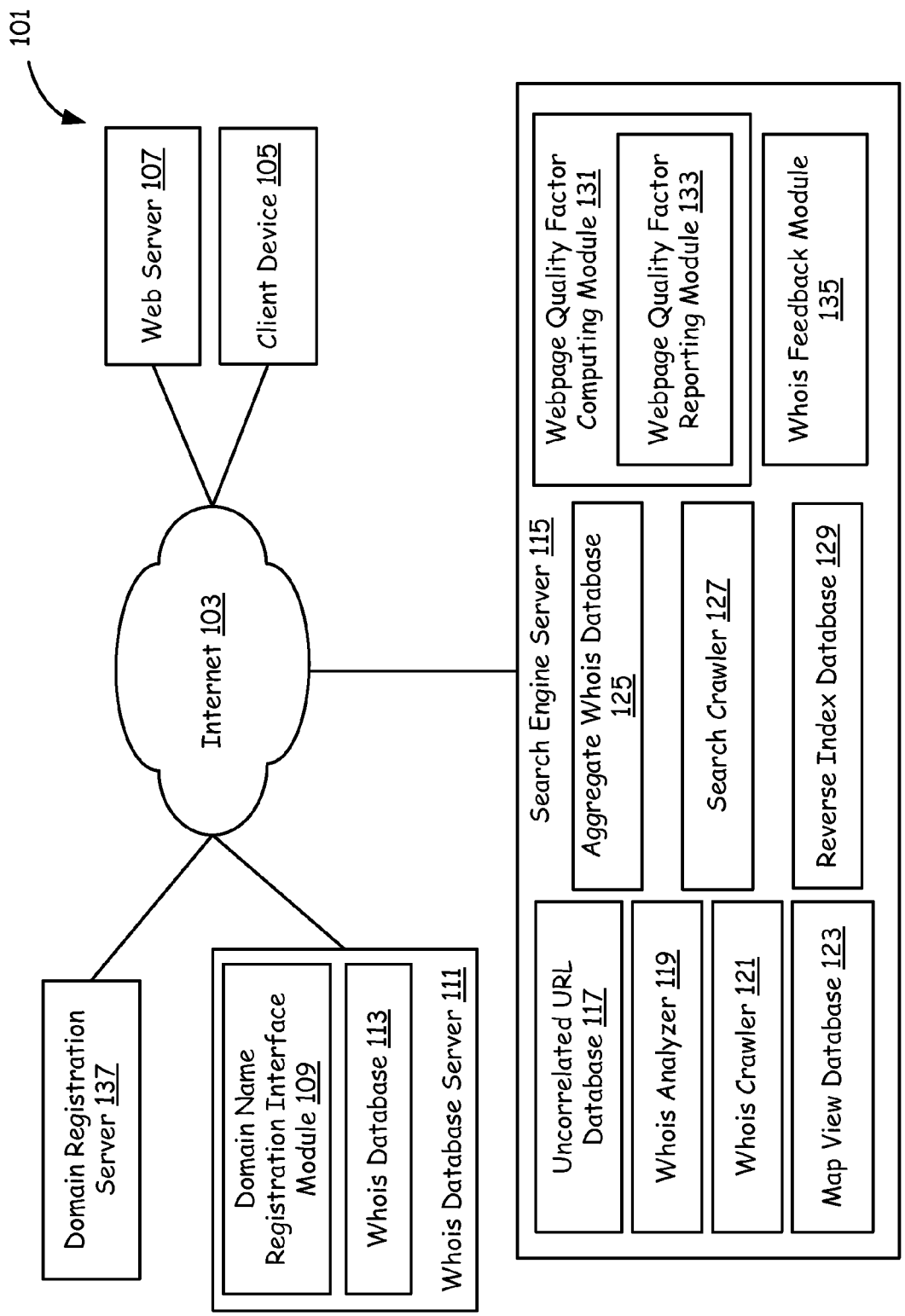
FIG. 1 is a perspective block diagram of a network that uses search engine feedback with the whois database server for maintaining a reliable and up-to-date set of whois records.

FIG. 1 is a perspective block diagram of a network that uses search engine feedback to the whois database server for maintaining a reliable and up-to-date whois set of records. Internet application usage is increasing tremendously, specifically for business and consumer applications. E-business, E-Commerce, E-marketing, etc. are all common application categories of the Internet. In that context it can only be possible to differentiate businesses on the Internet into those types that are by and large permitted broadly or within some framework and discipline and other types that are considered to unethical and may be dangerous.

When using the Internet for such diverse business applications, it becomes useful to impose some form of discipline, so that one type of business does not interfere with other type of business. In this endeavor of setting up virtual boundaries for each business, it becomes important for each of the business firms who do business on Internet to abide by certain good practices for their own good and long time sustenance. To accomplish this goal, some effort, and an amount of discipline needs to be endeavored by every Internet user, whether it is a business firm or an individual using the network.

A common problem that business firms face on the Internet is the safety of their domain name or trademarks, which are often a constituent part of a URL of their website(s). The domain name is typed in an address field of a web browser on a client device so that a corresponding web page opens on the client device display from the addressed website. Websites are hosted largely by companies or business firms and are used for promoting their businesses on the Internet and furnishing all the details that are essential to promote their business.

In order to make their websites available for crawling and access by search engines or directly browsed by one or more users, it is important to host the website on a server accessible on the Internet and it's the website's domain name needs to be registered on domain registration system so people can find that site on the Internet. These domain registration systems for respective domains for e.g. .com, .org, .net, etc., registers domain name into the corresponding domain(s) on the Internet.

Domain names are good if they are short and easy to remember, or correlate highly with words and names we all associate with. If they are short or properly associated, any user can easily remember them and directly type them in the web browser instead of searching them using a search engine. Each business has its own established domain name that has earned its own popularity and good will in the market. Thus domain names may be a company's trademark or its company name or brand name in some cases. In other cases, the domain name may be simple, short, and generic, like furniture.com or football.com. If a new company finds it hard to find an existing simple domain name, it may construct a domain name with combination of suitable keywords to generate some other domain names that are still meaningful and convenient for them.

An assigned domain name to a business firm needs to be registered on the domain registration system to be effectively searched on the Internet. Normally, registration will be done for a specified duration with specified registration fees. Since there is always demand for good domain names, they will often be lost to competitors on registration expiry. Thus, if an established domain name is lost, it often means that substantial good will and business is lost with it.

Internet squatters, scammer, and some malicious websites are always in constant search of good domain names to establish their illegitimate businesses. Domain names once lost may be lost forever or it may require long legal battle to get it back. In order to protect legitimate businesses, it's therefore necessary to constantly monitor the domain name registration period and related information. Tracking the domain registrations can be conveniently done by whois database server administration. A whois database server will have all necessary pieces of information for a business firm that provides the domain name registration details.

There are a large number of good domain names occupied by Internet squatters and scammers. There are occasions where a lot of websites under constructions occupy good domain names. There are no Internet protocols that dictate disciplines on the effective enablement and usage of these resources. Some of the malicious websites track registration expiry of good domain names possessed by some of the reputed business firms and take over them and host undesirable websites with those domain names, with the intention of diverting traffic to their websites.

In order to implement disciplinary steps to stop Internet domain name related menacing, search engines can be considered as a starting point. Because search engines maintain a repository of all domain names or URLs comprising them, in a database called a reverse index database. This database contains all the domain name information as part of their URLs, irrespective of whether the firms are legal or illegal business firms. Normally legal business firms explicitly declare their identification through some publicly accessible databases maintained as whois database records on servers called whois database servers that contains information about a registered company or a business firm. Whois information is a concise record of key pieces of information that allows a legitimate user to learn more on/about that business firm. By learning through a whois databases about a business firm, one can visit their website and explore more information about the business of interest.

More and more companies appear in a whois database automatically when they register their domain name on the domain name registration server. Thus, this database can be considered as a more legitimate reference database for implementing systematic regulations and disciplines on the Internet and to nail down illegal Internet squatters, scammers, etc. Once nailed down, users, businesses, authorities, violators, etc., can be warned or notified of the finding and any undesirable conduct or inconvenience that is being caused can be fixed. If certain operations still continue unwanted menacing after a notice or warning, search engines can remove their domain names from their index database; if continued further, search engines can even stop crawling those domains that are registering and hosting those domain names and their websites. This will likely triggers a disciplinary action by those domain owners to corner or correct those illegal websites and/or remove them from registration.

The block diagram 101 of FIG. 1 illustrates a network infrastructure implementing a reliable and up-to-date set of whois database records for monitoring domain name assignment for business firms. A whois database server 111 and the search engine server 115 are communicatively coupled via the Internet 103 or some other suitable wireless, wireline, optical, and/or other network. One or more web servers 107 that are coupled to the Internet controls websites hosted by many business firms. one or more users browsing from one or more client devices 105 perform searching and browsing of Internet content and websites. A user also provides feedback on the browsed web page and apart from or together with the search engine(s) of FIG. 1 can gather user's interaction parameters as inputs to the web page quality factor-computing module 131 of the search engine server 115.

A whois database server 111 has a whois database 113 that contains all the whois records of corresponding business firms. In one embodiment, the domain name registration server 137 automatically extracts the whois record of a business firm during the domain name registration operation on the Internet. A domain name registration interface module 109 facilitates an interface with the whois database server 111 and the domain name registration server 137 when extracting the whois record information.

The search engine server 115 of FIG. 1 has its functionality integrated with the whois database server 111. A whois crawler 121 crawls through a plurality of whois database servers for whois records and gathers whois information into a database called the aggregate whois database 125 in FIG. 1. Various main components of that whois information that is of important concern for search engine server 115 are domain names contained in the URL, contact address, GPS (Global Positioning System) coordinates, E-mail address, telephone numbers, and/or like information. The crawled whois information is aggregated into a database called "aggregate whois database" 125 in FIG. 1.

In one embodiment, the whois crawler crawls and gathers domain names, in a category specific manner. The main category of domain names are trademark domain names, branded domain names, generic domain names and other arbitrary domain names. Accordingly, the aggregate whois database 125 is preferably also organized into aggregate trademark domain name database, aggregate branded domain name database, aggregate generic domain name database, and aggregate of other arbitrary domain name database, respectively.

The search crawler 127 of search engine server 115 periodically crawls through the Internet and generates a database called reverse index database 129, with all the indexed items or search strings (keywords) associated with their URLs (comprising domain names of business firms). Generally the entries in the database 129 do not give any clue whether the business firm associated with a URL has a legitimate whois database record for its purported identity on the Internet. This information can be derived by whois analyzer module 119 in conjunction with aggregate whois database 125.

The search engine server 115 of FIG. 1 has a web page quality factor-computing module 131. This module 131 retrieves the various user's interaction parameters with a web page, malware related parameters of a web page, user's explicit web page rating information, etc., which are used in some combination to compute contact address correlation parameter (between web page and whois database contact addresses). Using all these parameters, the search engine server further computes a factor called the web page quality factor (or web page rating number), a measure of the web page quality, using the module 131. The module called the web page quality factor-reporting module 133 facilitates an interface so that this factor that pertains to a web page is displayed or reported to a user and any other modules that interact with the search engine. A whois feedback module 135 communicates the web page quality factor to a corresponding whois database server to generate quality factor database. The entries in the quality factor database are associated with the respective whois record entries of the business firm in the whois database server.

In one embodiment, the search results are displayed on a world map. For example, the search results may be directly displayed on the world map right over their street address or GPS location of the business or site. Database pertaining to the world map, and also satellite views of the earth's surface, are maintained within the map view database 123 of FIG. 1.

Figure 2:
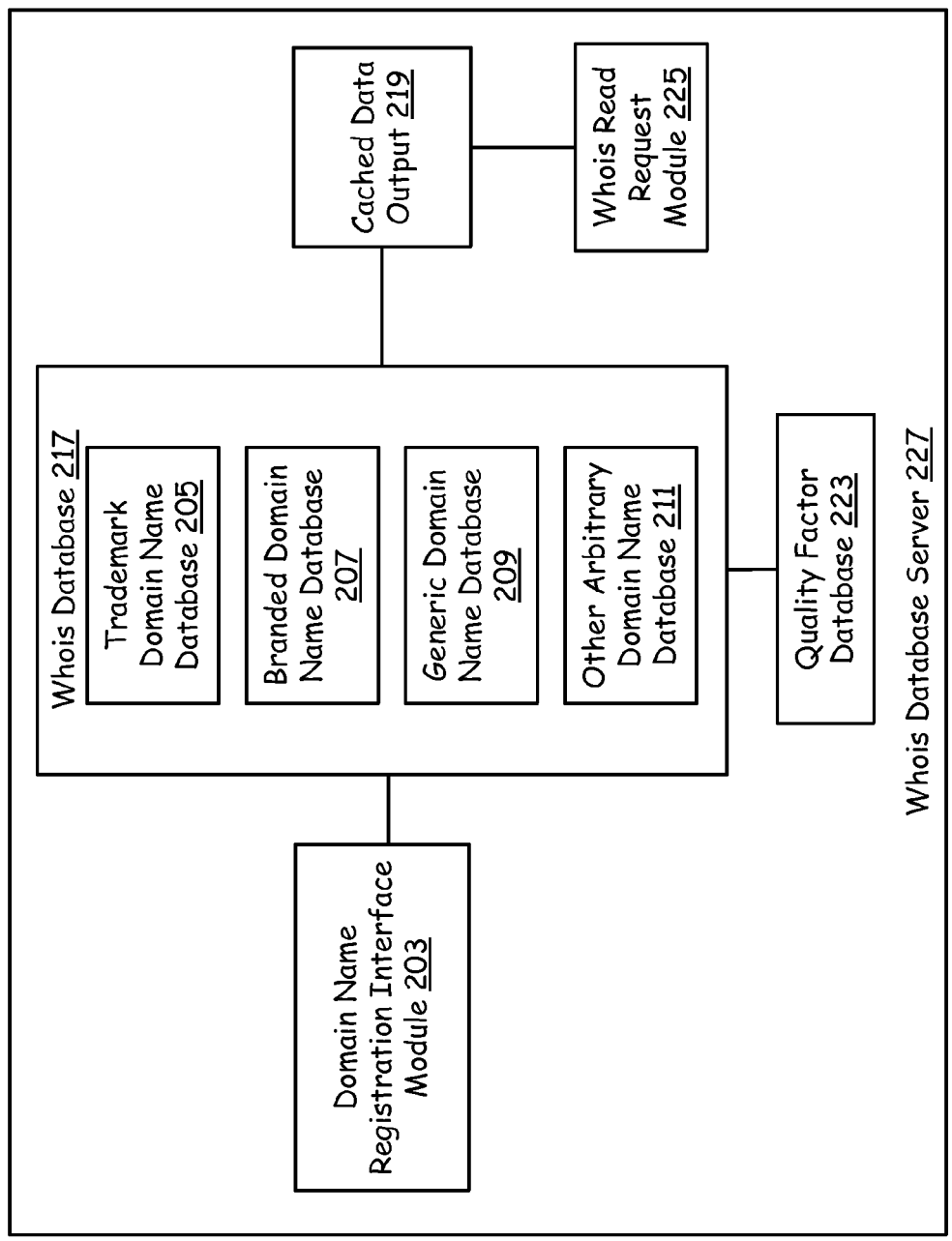
FIG. 2 is a block diagram showing the creation of a new whois record and a retrieving the whois record from a whois database server.

FIG. 2 is a block diagram showing the creation of new whois record and the retrieving of the whois record from a whois database server. The domain name registration interface module (analogous to module 109 of FIG. 1) provides an interface so that the whois record information is captured and assembled into aggregate whois records during an online or an offline domain name registration with the domain registration server (analogous to server 137 of FIG. 1). Business firms approach domain registration server administration sites to register their company in the respective domain. The approach for the registration involves either online or offline processing.

In an online registration, the business firm's contact person opens a registration account on the domain registration server and completes all the registration entries by himself and pays corresponding fees online. During an offline registration process, the business contact person furnishes all the necessary registration information to the domain registration server administration (e.g., by mail, phone, etc) so that the service does the registration entries on behalf of the corresponding business firm. In one embodiment, during both online and offline registrations, the record will be sorted into one of the four categories of the registration databases: trademark domain name database, branded domain name database, generic domain name database, and other arbitrary domain name database. In categorizing the domain name registration the domain registration server administrator usually takes the consent of the business firm's contact person.

In one embodiment, all the four categories will be merged and sorted into a single whois database for convenience (of backup, etc.). Each record in the whois database will be associated with a search-engine-generated respective web page quality factor. Read access to whois database(s) is typically provided on a category by category basis.

The block diagram 201 of FIG. 2 shows the interaction of various components of a whois database server 227 (analogous to server 111 of FIG. 1 repeated) during the read/write operation into the database. The domain name registration interface module 203 facilitates entry of new whois record and facilitates changes to old records that can be done online or offline via domain registration server 137. Registration is performed on category basis into four categories of databases such as trademark domain name database 205, branded domain name database 207, generic domain name database 209, and other arbitrary domain name database 211. A database module called quality factor database 223 that contains the received feedback data from the search engine server or other sources on each whois record (corresponding to a browsed URL on the search engine) is contained in the whois database.

The feedback quality factor entries corresponding to each whois record will get associated with a respective whois record in the whois database. This information will be communicated to the owner or business firm contact person so that they can improve their website for achieving a better quality and reliability and notice squatter, scammers, or like problems early on in the process. Requests for reading the whois database will be submitted through a module called a whois read request module 225 that couples to cached data output 219. Upon receiving the request, the authenticity of the request will be tested further so that it can be concluded that the requester is not a spammer or some other unwanted entity on the Internet.

Figure 3:
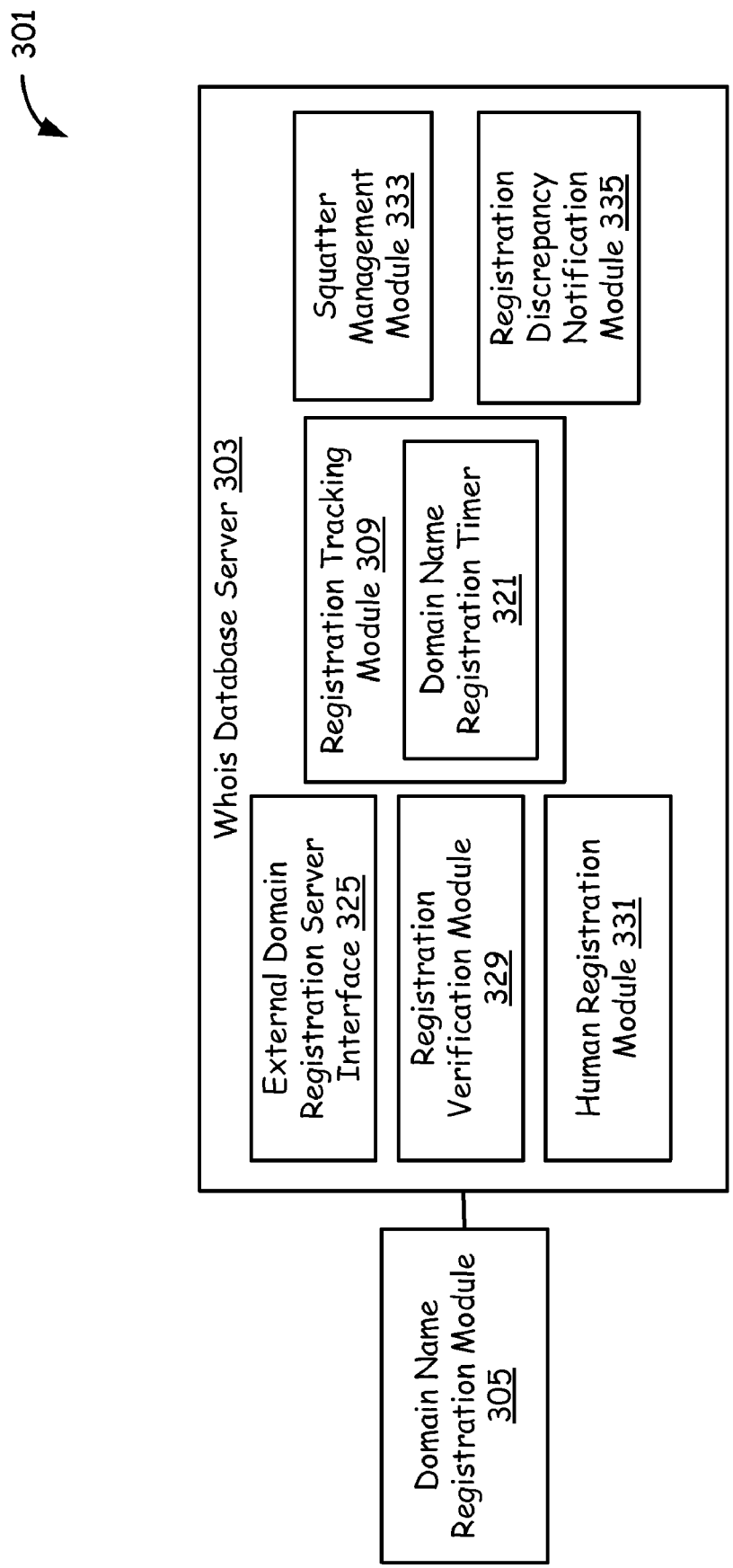
FIG. 3 shows the block diagram of how to perform registration management in a whois database server.

FIG. 3 shows the block diagram of the registration management in a whois database server. The domain name registration module has the necessary interface with the whois database server in the form of domain name registration interface module 203 of FIG. 2 for both the online and offline registrations. The whois database server of FIG. 1 has an external domain registration server interface module that provides an interface with whois database server so that the whois records for domain names that appear in some other domain registration server can also be created, accessed, and/or maintained.

The registration verification module provides a means of verifying the domain name registration in the current domain where the whois database server exists, and also (possibly) from some other domains. A human registration module is a human interface to the whois database server so that a person can create a whois record from the whois database server console (or keyboard, etc.).

A module called a squatter management module provides/facilitates managing the squatters or other unwanted entities. This functionality is implemented by the analysis of the uncorrelated URL database 117 of FIG. 1. Upon analysis, a registration discrepancy notification module sends a warning message to the business firm's contact person and to the whois administrator, so that they can act and fix the issue.

For each entry in the whois database server, it is desirable to keep track of more the registration details in some embodiments. This function is performed by a registration-tracking module of the whois database server of FIG. 3. The registration-tracking module has a timer that does the function of tracking the valid domain name registration duration. It responds by sending reminders or warning messages when a registration is close to its expiry. Both the whois administrator and the business firm contact person will be alerted by this timer. Thus, the business firm's contact person will act timely to renew his domain name registration.

The block diagram 301 of FIG. 3 is an expanded view of whois database server that is used for creating, maintaining, and managing whois records. The domain name registration module 305 of domain registration server 137 has the necessary interface(s) with the whois database server 111 of FIG. 1 in the form of domain name registration interface module 203 of FIG. 2 for monitoring the registration status of a business firm on the whois database server. The squatter management module 333 is also shown in FIG. 3.

The registration-tracking module 309 has a domain name registration timer 321 in FIG. 3. The registration tracking module 309, with the domain name registration timer 321, does the function of tracking the valid domain name registration duration. The system responds by sending a reminder or warning message when the registration is close to its expiry.

The squatter management module 333 has interface with the uncorrelated URL database 117 of FIG. 1 and it facilitates the analysis and management of squatters, etc. The registration discrepancy notification module 335 sends warning messages to the business firm's contact person and to the whois administrator, so that the right individuals and entities are contacted with the respective business firms corresponding to the URLs in the uncorrelated URL database 117 of FIG. 1. This way, these issues may be acted on or fixed before they become a large or progressive problem to businesses and consumers.

The external domain registration server interface 325 provides an interface with whois database server so that the whois records for domain names that appear in some other domain registration server(s) can also be retrieved and created. The registration verification module 329 provides a means of verifying the domain name registration and also from some other domains. A human registration module 331 provides human interface for a person who works from the whois database server console or interface.

Figure 4:
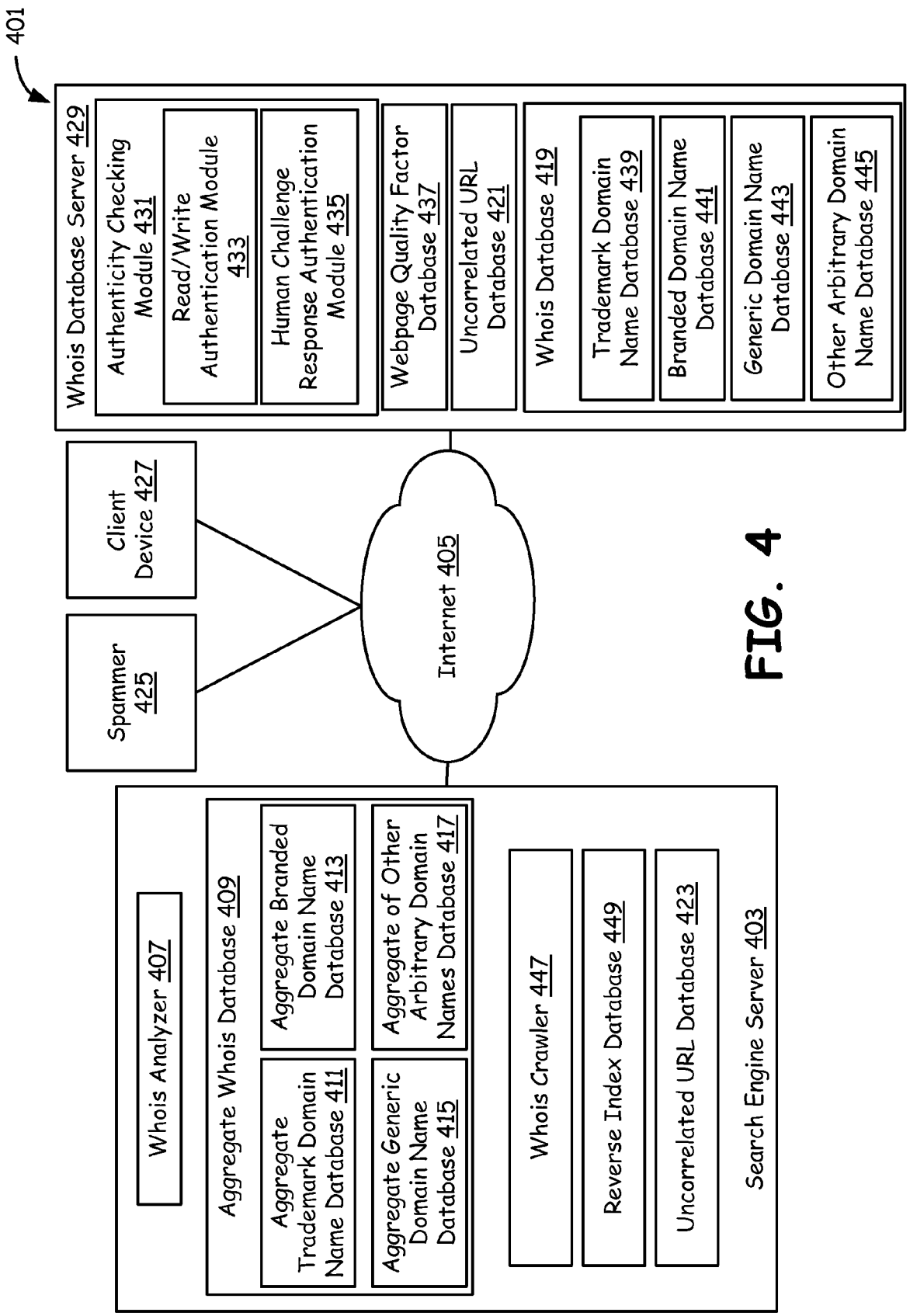
FIG. 4 is a block diagram of search engine server interacting with the whois database server on the network and showing the functionality of the whois analyzer.

FIG. 4 is a block diagram showing a search engine server interacting with the whois database server on the network. FIG. 4 shows the functionality of the whois analyzer, in accordance with the teachings herein. A whois analyzer is a module that can correlate domain names from reverse index database 129 and the aggregate whois database 125 of FIG. 1 and generate an uncorrelated domain name list for further action.

It becomes desirable to block spammers from the whois database server, as they will harvest E-mail addresses and generate unwanted traffic on the Internet. When a whois crawler of the search engine crawls all the whois database servers on the Internet, they have to be given crawling permission with clear login identification into a whois database server, or the whois database servers can remember the identity of a search engine server and allow them to harvest whois information periodically or systematically. Other human access into the whois database server can take place through human challenge response authentication, a mechanism in which only a human can recognize some warped text character on distorted background and enter them into a field to get access permission. It is not possible for automated spammers to pass this test and they fail to access the whois database for harvesting the E-mail addresses.

The networked block diagram 401 of FIG. 4 has search engine server 403 (analogous to server 117 of FIG. 1 repeated) communicatively coupled with the whois database server 429 (analogous to server 115 of FIG. 1 repeated) via Internet 405 (analogous to Internet 103 of FIG. 1 repeated). Spammer 425 and client device 427 (analogous to device 105 of FIG. 1 repeated) are also communicatively coupled with the search engine server 403 and whois database server 429 via Internet 405 in FIG. 4.

The search engine server 403 has a whois analyzer 407 (similar to analyzer 119 of FIG. 1 repeated) which correlates the domain names from the aggregate whois database 409 (analogous to database 125 of FIG. 1 repeated), a whois crawler 447, the reverse index database 449 (analogous to database 129 of FIG. 1 repeated), and an uncorrelated URL database 423. The aggregate whois database 409 is organized into four categories of databases: an aggregate trademark domain name database 411, aggregate branded domain name database 413, aggregate generic domain name database 415, and aggregate of other arbitrary domain name database 417. In other embodiments, other divisions or no divisions can be used and the system will still operate to provide various benefits taught herein. For performing the correlation between the domain names, the whois analyzer 407 picks domain names from the aggregate whois database 409 and the Whois database 419.

The whois database server 429 includes an authenticity checking module 431, a webpage quality factor database 437, an uncorrelated URL database 421, and a whois database 419. The Whois database 419 includes a trademark domain name database 439, a branded domain name database 441, a generic domain name database 443, and another arbitrary domain name database 445. The uncorrelated domain names are considered for further action whereby an alert signal is issued to various business firms by the whois database server. The authenticity-checking module 431 of the whois database server 429 tests the authenticity of the search engine crawler by crawling the whois database and includes a read/write authentication module 433 and a human challenge response authentication module 435. The whois database includes a trademark domain name database 439, a branded domain name database 441, a generic domain name database 443, and another arbitrary domain name database 445.

During crawling operations the search engine has to identify itself by sending a pre-assigned identity, the submission of which prompts the whois database server to permit the crawling of the whois database 419. The human challenge response authentication module 435 allows human access into the whois database via a human challenge response mechanism. Webpage quality factor receiver module 437 receives the web page quality values/indicators computed and communicated by the search engine server. The web page quality factors will augment a whois record of a business firm as metadata.

Figure 5:
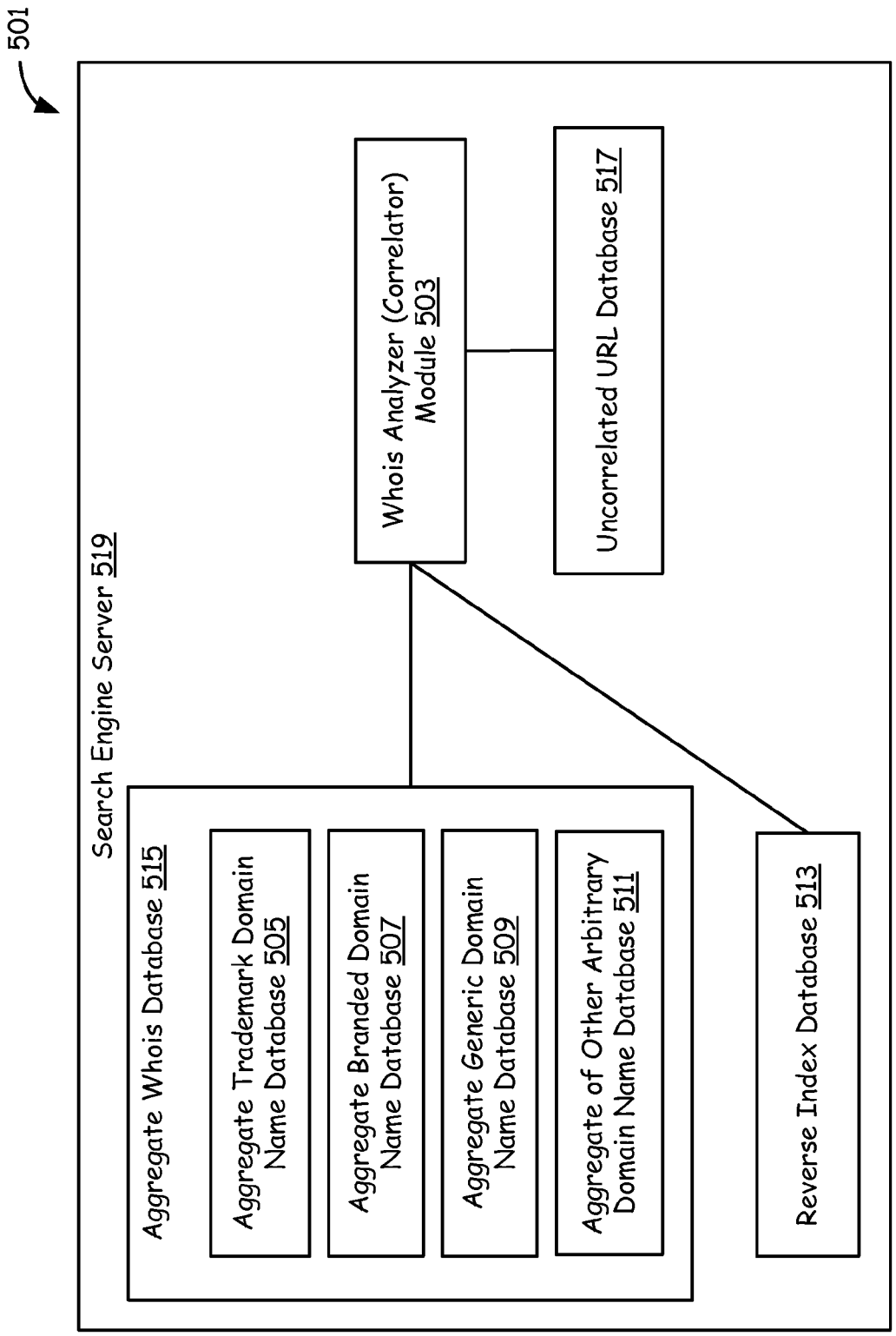
FIG. 5 is a block diagram showing the functionality of a whois analyzer module of the search engine server for segregating uncorrelated URLs (Universal Resource Locators)

FIG. 5 is a block diagram showing the functionality of a whois analyzer module of the search engine server of FIG. 1 for segregating uncorrelated URLs (Universal Resource Locators). A whois analyzer takes two sequences of URLs at its inputs, one from the reverse index database and the other from the aggregate whois database.

From the reverse index database, the indexed URLs are read out in the right sequence after being sorted out, for example, they may be provided in alphabetical order. URLs from the aggregate whois database are also read out in the same order for ease of correlation. In one embodiment, the aggregate whois database is read out in a sequence, and comprises the domain names in the URLs with the category usage, as applicable. For each pair of URLs correlated for alphabetically-ordered domain names, a correlation number is computed. If there is no good correlation with a URL picked from the reverse index database for every URL picked from the aggregate whois database for a given alphabet, then that URL in the reverse index database is blacklisted and put under monitor for further actions.

The blacklisted URLs can be communicated to the whois database administration automatically by the whois feedback module 135 of FIG. 1. Further actions include communicating with corresponding business firm's administration via telephone, E-mail, etc. and persuading or convincing them to complete a whois registration so that they will identify themselves on the Internet, as who they are. If they are further found being noncompliant with ethical Internet protocols, their URL can be removed from the search engine's reverse index database, and subsequently be stopped from performing crawling operations.

The block diagram 501 of FIG. 5 shows the functionality of the whois analyzer in implementing a protocol for the suppression of unethical fraudulent business on the Internet. The whois analyzer 503 receives URLs comprising the domain names as inputs from the aggregate whois database 515 (analogous to database 125 of FIG. 1 repeated) and the reverse index database 513 (analogous to database 129 of FIG. 1 repeated). In one embodiment, the aggregate whois database is categorized into an aggregate trademark domain name database 505, an aggregate branded domain name database 507, an aggregate generic domain name database 509, and an aggregate of other arbitrary domain name database 511.

A whois analyzer 503 receives the URLs in the alphabetical order (or some other meaningful order) from the databases 515 and 513. In this process, the system correlates, every URL from the reverse index database 513 with every URL from the aggregate whois database 515 for a given alphabet or given order. If there is no exact correlation between the two URLs, then that URL in the reverse index database 513 will be blacklisted by a sift URL and blacklist signal generator 517. The blacklisted URLs will be communicated from the search engine server 117 to whois database server 115 of FIG. 1 and subsequent action is called upon by the whois database server.

Subsequent action includes communicating business firms corresponding to the blacklisted URLs for persuading or to convince them for a formal whois registration for identifying themselves on the Internet. If any unethical fraudulent activity is detected by the blacklisted URLs, they are removed from the reverse index database 513 and search crawler 127 from the search engine server 117 of FIG. 1 stops crawling those domain names. The whois administrator will also inform a domain registration system administrator to be watchful of these websites whose URLs are noncompliant in activity or business on the Internet.

Figure 6:
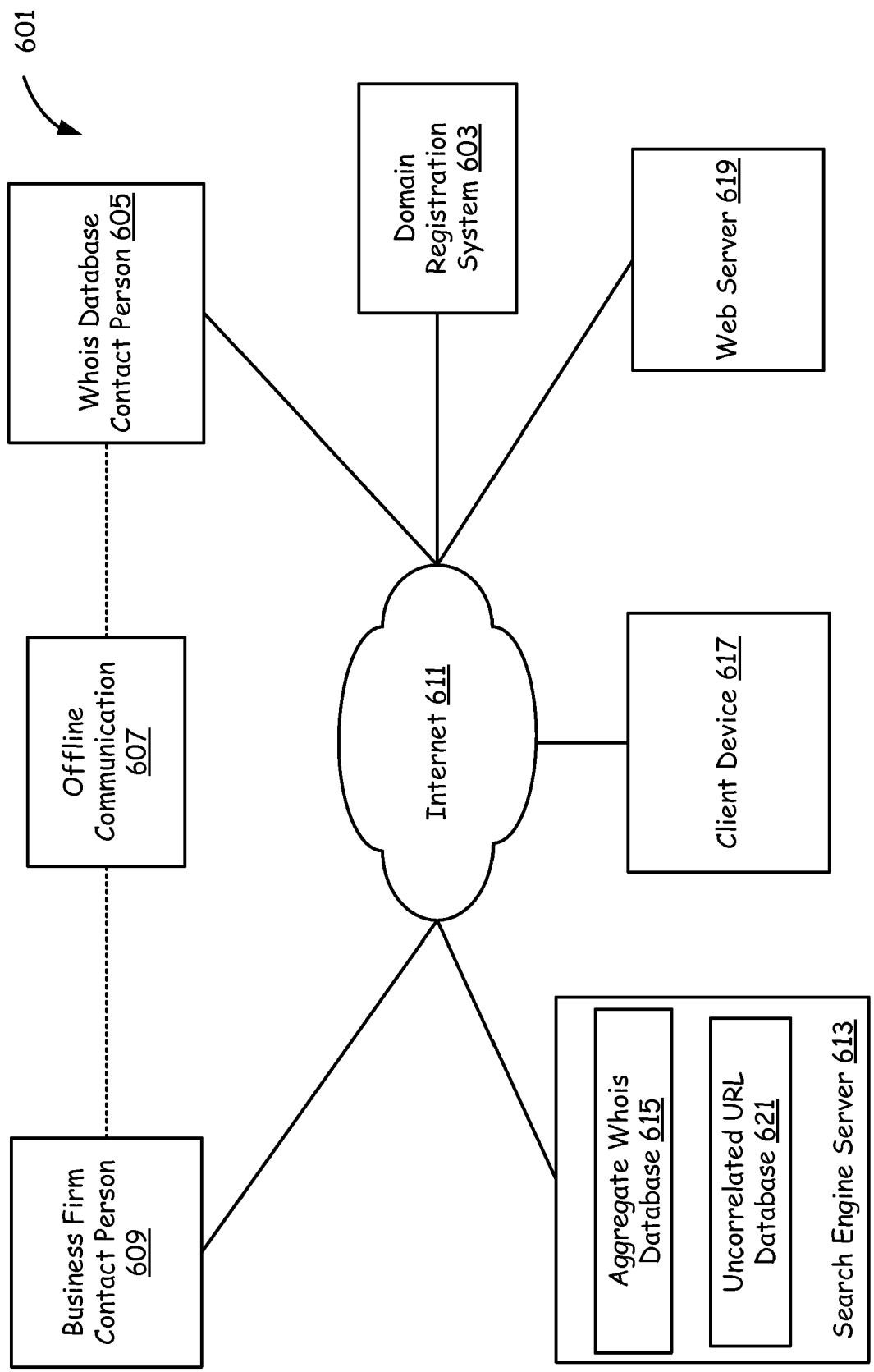
FIG. 6 shows online and offline communication modes for exchanging information among various entities on the Internet.

FIG. 6 shows the online and offline communication modes for exchanging information and performing database management among various entities on the Internet 611. There are many units of information that flow back from search engine server to whois database server and also to the domain registration system when performing the operations taught herein. Some of the important parameters communicated in the feedback path from the search engine server to the whois database server are a web page quality factor, the uncorrelated URLs discussed with FIG. 5, a malware-related report of the web page, discrepancies detected in the contact address of the business firms, etc.

In one embodiment of the present invention the web page quality factor is computed as an overall web page rating number or identifier using the web page quality factor-computing module 131 of FIG. 1. The web page quality factor computing module 131 receives, as inputs, user's web page interaction parameters, web page malware reports, and other useful information parsed from the website on the corresponding business firm from the client device during browsing, etc. the system generates web page quality factor number(s) and provides them for output. Also, any contact address related discrepancies that are detected will be reported by the system. All the parameters discussed above will be communicated back to whois database sever as metadata corresponding an URL.

Any information that is communicated back to whois database server will further be communicated to respective business firms so that they can immediately act and correct any anomalies in the information they have furnished in the past and heed attention to keeping their website up to date. Based on this feedback, a business firm can decide on whois registration if they have not registered at present.

The whois database administration undertakes a responsibility to all its subscribers to regularly remind them of any discrepancies or anomalies that occur in the search engine server computed and communicated parameters. This responsibility is in addition to the domain name registration tracking and reminding of renewals, the providing the intended feedback information, etc., discussed with FIG. 1. There are various modes of communications, among which E-mails, telephone calls, etc. are common media for contacting a business firm.

The diagram 601 of FIG. 6 has whois database server 605 (analogous to server 115 of FIG. 1 repeated) communicating to search engine server 613 (analogous to sever 117 of FIG. 1 repeated) via Internet 611 (similar to Internet 103 of FIG. 1 repeated). There are other entities that are in turn communicatively coupled to the whois database server 605, such as a business firm or contact person 609, domain registration system 603 (analogous to system 137 of FIG. 1 repeated), offline communication device, client device 617 (analogous to client device 105 of FIG. 1 repeated), and web server 619 (analogous to server 107 of FIG. 1 repeated) via the Internet 611 and/or other network(s). Search engine server 613 includes aggregate whois database 615 and uncorrelated URL database 621.

As there are very useful pieces of information, for example domain name renewal notice, discrepancies in the website contact address, etc., to be communicated among various Internet entities, the media of communication should be very reliable with a very low overall probability of losing the information during communication. This can only be achieved if there are multiple media for alternate ways of communication in the systems.

In FIG. 6, the Internet 611 is an infrastructure that facilitates communication via E-mail. Offline communication infrastructure (offline communication 607) between whois administrator 605 and a business firm contact person 609 and domain registration system administration 603 includes telephone, postal services, etc. Even if one medium fails, there is an alternate medium through which information will still reach the desired destination.

Figure 7:
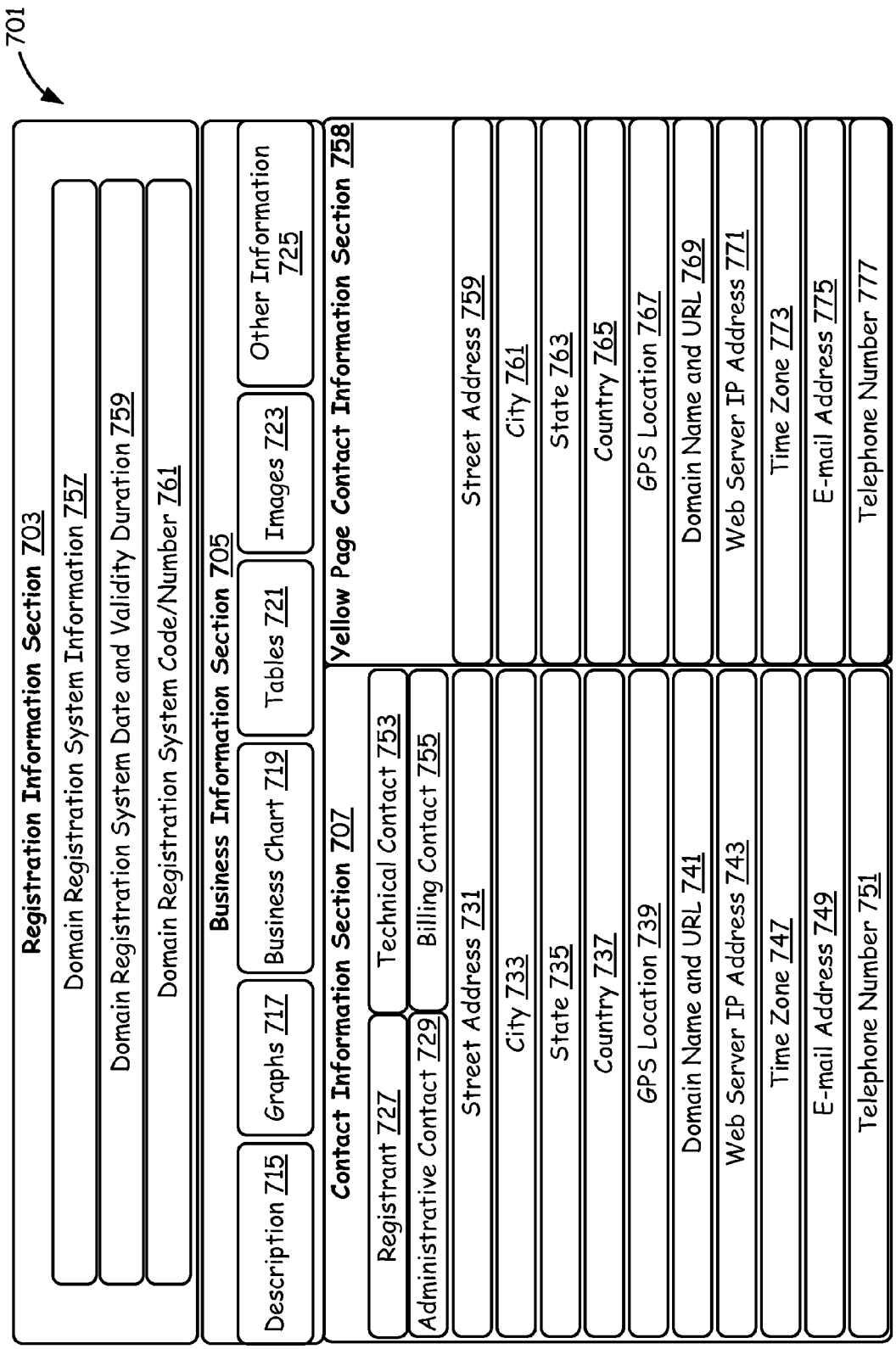
FIG. 7 is a screen snapshot of a whois record format in a whois database server, in accordance with one embodiment.

FIG. 7 is a screen snapshot of a whois record format in a whois database server. The whois record should have at least all the essential pieces of information which are needed by the search engine server for computing parameters such as contact address correlation and at least the minimum information expected by any user accessing whois database from a client device. The possibility of spammer access into the whois database will be blocked by authenticity checking module 433 and human challenge response authentication mechanism 435 of FIG. 4. The whois crawler 121 of FIG. 1 crawls whois databases for whois record information through authenticity checking module 433 of FIG. 4. If the authenticity fails, those crawlers are not permitted into the whois database server.

In one embodiment the whois database record from a whois database server is conveniently divided into three sections: a registration information section, a business information section, and a contact information section in FIG. 7.

The registration information section has all the necessary registration details of business firms such as whois registration information (i.e. the whois registration service provider's details) and domain registration system information (the service provider's details). The domain registration system information also specifies the top level domain, in which the business is registered, such as .net, .com, etc., the registration date and duration on both the whois database server and the domain registration system, and the registration code/number on the whois database server and domain registration system.

The business information section contains all the business specific information for a given business firm. It has business description; business data in the form graphs, charts, table, etc; images of the product and other relevant information. If the business firm feels that certain items in this section are confidential they do not need to disclose those details on-line.

The contact information section is a very useful section. This section includes the name of the registrant, i.e. the title of the business firm, name of the technical contact person, name of the administrative contact person, billing contact person, street address, name of the city, name of the state, name of the country, GPS location of the business firm, domain name and URL, web server IP address (if available), time zone, E-mail address of the business firm, and telephone number. In other embodiments, some of this information may not be recorded, and in other embodiments, more information may be included. The various options in FIG. 7 are exemplary in one embodiment.

A screen snapshot 701 of FIG. 7 illustrates important sections of a whois database record. FIG. 7 has three main sections: a registration information section 703, a business information section 705, and a contact information section 707.

The registration information section 703 has the whois registration information 709 such as the name of the whois service provider, name of domain registration system 757 (for e.g. .com, .org, .net, etc.). Further, this section has information on registration date and validity duration for both the whois database registration in entry 761, and for domain registration system in entry 759. The registration duration is the period of validity of the registration for a given service provider. The valid period starts from the date of the registration. The whois registration code/number 761 is a unique code/number identifying the whois registration for corresponding service provider (identified by the information from FIG. 7). Similarly, the domain registration code/number 761 is a unique registration assigned during the domain name registration on the service provider identified by the information 757.

The business information section 705 contains business description 715 textually. Other business details are projected in the form of graphs 717, business chart 719, and table 721. Product details can also be portrayed using their images 723. Miscellaneous information is furnished as other information 725. In other embodiments, a subset of, or more information than that shown in section 705 of FIG. 7 may be allowed.

The contact address section 707 has all the meaningful and legitimate contact details through which a corresponding business firm can be reached. It consists of name of the registrant i.e. the business title 727, technical contact person's name 753, administrative contact person's name 729, and billing contact person's name 755. The physical address part consists of street address 731, name of the city 733, name of the state 735, name of the country 737, and GPS location information 739. Again, in other embodiments, more or less information than that shown here may be implemented.

Apart from the physical contact address details are the domain name and URL information 741, web server's IP address 743, time zone information 747, E-mail address information 749, and the telephone number 751. Time zone information 747 is useful to know the working hours of the business firm.

The yellow page contact information section 758 has meaningful and legitimate contact details through which a corresponding business firm can be reached. It consists of street address 759, name of the city 761, name of the state 763, name of the country 765, and GPS location information 767. Also included, apart from the physical contact address details of the yellow page contact information section 758 are the domain name and URL information 769, web server's IP address 771, time zone information 773, E-mail address information 775, and the telephone number 777. In other embodiments, more or less information than that shown here may be implemented.

Figure 8:
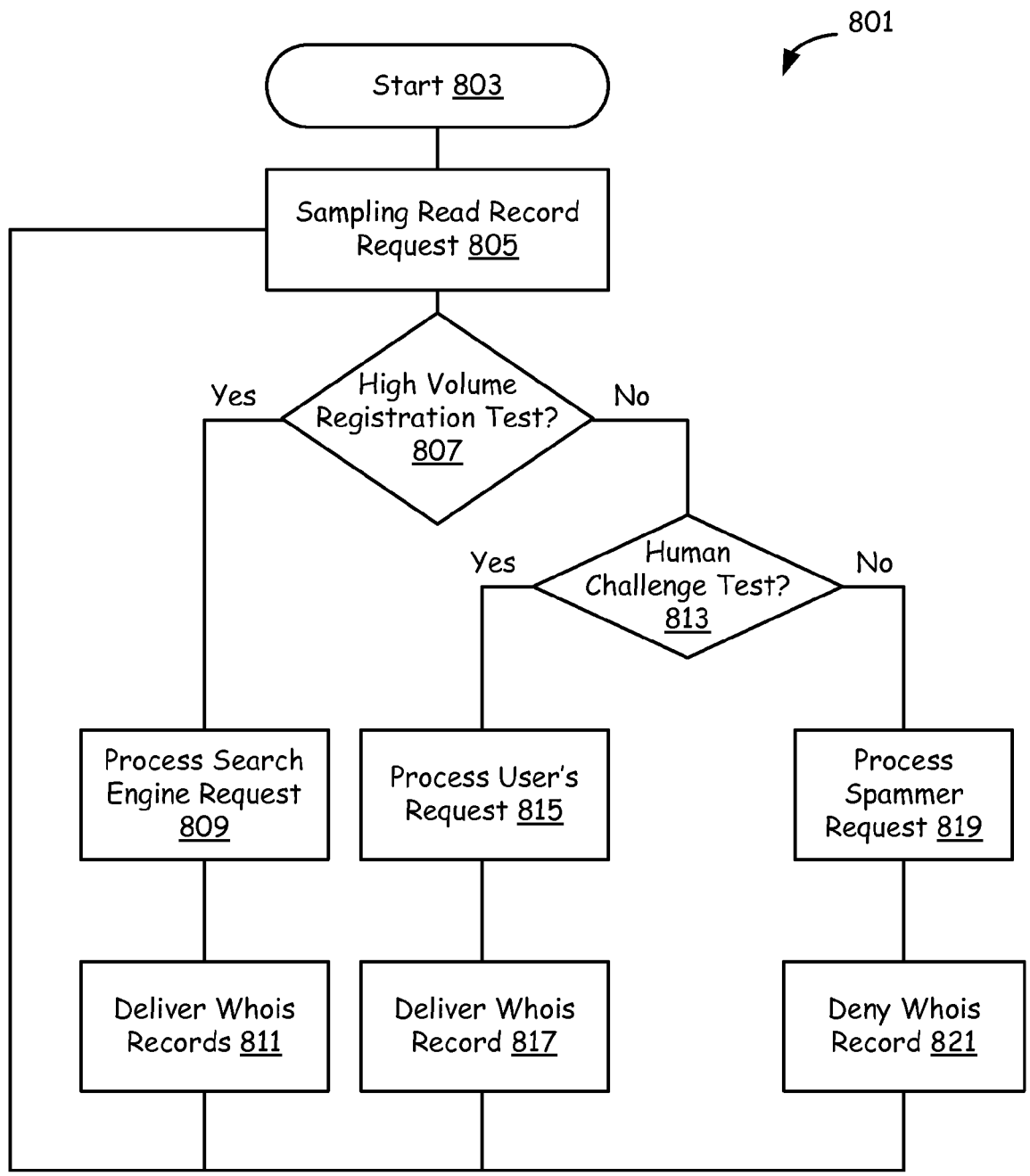
FIG. 8 is a flowchart showing the actions performed by a whois database server that provides read access for various entities on the Internet.

FIG. 8 is a flowchart showing the actions performed by whois database server to provide read access for various entities on the Internet. As a whois database is a collection of all the important information, it is an opportunity for spammers to harvest E-mail addresses. The danger of E-mail harvesting by spammers is denied by access authenticity checking mechanisms, in accordance with the teachings above.

Before allowing access to the whois database record, a read request first has to be placed in the whois request module 225 of the whois database server 227 of FIG. 2, which will be sampled by the authentication-checking module 433 of FIG. 4. Authentication checking module tests whether the requesting entity or a requester has the required authenticity or not. If the requester has a prior registration on the whois database server availing the authenticity in some form, they will be provided for read access for the whois records from the whois database, otherwise access will be denied.

If it is a human requester, such as user trying to access whois record from the client device, he/she will be prompted with human challenge response, which is basically a mechanism in which only human can recognize some warped text character on distorted background and enter them into a field to get access permission. It is not possible for automated spammers to pass this test, thus they fail to access the whois database for harvesting the E-mail addresses.

Flowchart 801 of FIG. 8 shows the process performed by the whois database server during a read access to the whois database. After start at a block/step 803, at next block/step 805 whois database server performs sampling the record request by the module 225 of FIG. 2, sent by any entities on the Internet, such as search engines, users, spammers, etc.

At next decision block/step 807, it checks the registration authenticity for whether the requesting entity has prior permission to access the whois database or not. If the requesting entity has prior registration permission, at the block/step 809, the whois database server considers it as a valid search engine server and processes its request. In the block/step 811, the whois database server delivers the whois record from the whois database and goes back to the state labeled block/step 805 wherein the system waits for a fresh whois record request. If the requesting entity fails a registration test at the block/step 807, then the whois database server considers that the request is from human (such as a user) or a spammer (someone identifiable as a spammer via conduct or per a "denied access list" kept within the servers) and proceeds to next test in a block/step 813.

At the decision block/step 813, the whois database server poses human challenge response authentication test using the module 435 of FIG. 4. If the requesting entity qualifies the human challenge response authentication, at next block/step 815, the whois database server considers the entity as a valid human/user from a client device and processes the request. At the next block/step 817, it delivers the requested whois record, from there the process goes to state labeled block/step 805 where it waits and samples fresh whois record requests.

If the requesting entity fails a human challenge response/authentication test at decision block/step 813, the whois database server consider the request is from a spammer and process this request at the block/step 819. In block/step 819 the spammer information will be logged into a spammer history. Access to the whois record will be denied at the block 821 and from there the process goes back to the state labeled block/step 805 where it samples fresh requests.

Figure 9:
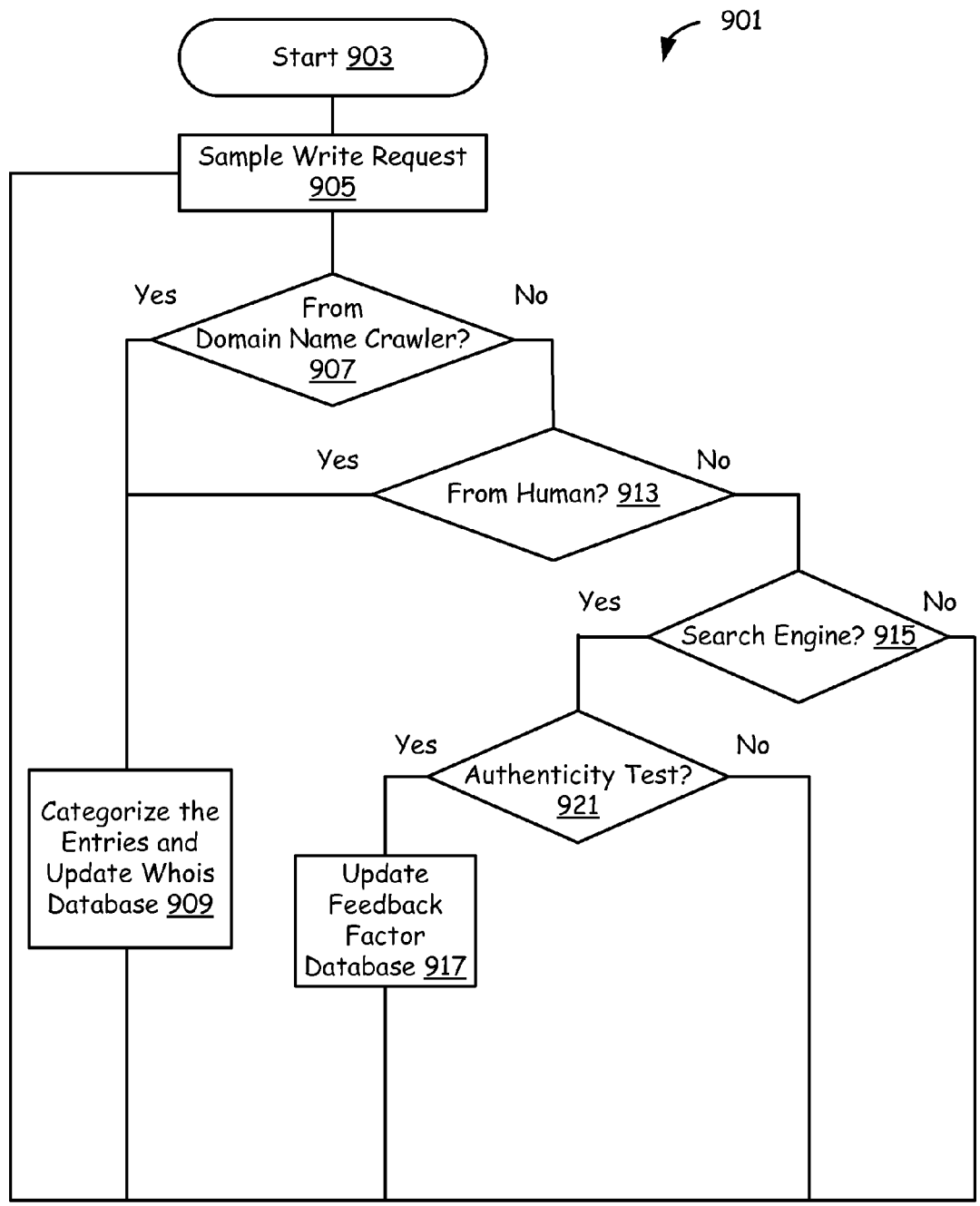
FIG. 9 is a flowchart showing the actions performed by a whois database server that provides write access for various entities on the Internet.

FIG. 9 is a flowchart showing various actions performed by a whois database server when providing whois write access for various entities on the Internet. Only authorized entities can have write access into a whois database. There are entities internal to the whois data base server, and these are apart from outside entities.

The internal (internal to whois database server) entities that have write access into the whois database are domain name crawler(s) 109 of FIG. 1 and any human operator who writes into the whois database right from the whois database server console using the registration interface module 323 of FIG. 3 (e.g., IT professionals). External entities that can write into the whois database for entering some specific type of data or various registration related information are the search engine server and a contact person logging in from a password enabled account on behalf of a business firm. A search engine server writes web page feedback metadata to the whois system (such as web page quality factor, web page malware report, etc. of a website hosted by a business firm) corresponding to a whois record of the whois database server. On behalf of a business firm, the contact person logged in from a password-enabled account performs registration and renewal through writing directly online into whois database.

Flowchart 901 of FIG. 9 is a process performed by a whois database server or servers during a write access into the whois database. After starting at a block/step 903, the whois database server performs sampling of the write request sent by any entity on the Internet via the block/step 905. At decision block/step 907, a test is performed to determine whether the request is from a domain name crawler, which is often an internal entity. If the test finds that the write requester as the domain name crawler, crawled domain names are retrieved from the crawler into the whois database at the block/step 909. In one embodiment, if the crawled domain names are available in categorized form as explained in FIG. 4 and FIG. 5, they can be written category-wise into the whois database, at the block/step 909. Each write operation can be scrutinized by the whois database server administrator for the correctness of the written information that goes into the whois record.

If the write requester is not domain name crawler at the decision block/step 907, the test proceeds to the next decision block/step 913 to check whether the request is from any human (internal or external). The human request can be internal to a whois database server, such as a whois administrator, or external to the whois database server, such as a contact person of a business firm logged in from the password enabled account online. If it is found to be a human request, external or internal, the registration information or the registration renewal information is received according to their categories at the block/step 909. After the entries received in the block/step 909, the whois database server prompts the whois administrator to scrutinize (manually and/or automatically) the entered information before storing into the whois database at the block/step 909. From block/step 909, the whois database server goes back to the block 905 for sampling the new write requests.

At the decision block/step 913, if it turns out not to be a human request, the whois database server tests whether the requester is an external entity such as a search engine server at the next decision block/step 915. If the test turns out to be a search engine, its authenticity will be tested in the next decision block/step 921. If the requester is an authentic registered search engine entity, it gets write permission so that it can write into the whois record with the feedback information at the block/step 917. Once a record is updated by the search engine at a block/step 917, the whois database server prompts the whois administrator for a manual (or computerized) scrutiny of the updated information at the block/step 917. If the search engine fails to the write authenticity at the decision block/step 921 the state of the whois database server goes back to the block 905 for sampling the fresh write request. If the requester is found not to be a search engine at the decision block/step 915 or if the test at step 921 fails, operation proceeds to the block/step 905 for sampling the fresh write request, with the decision that the requester may be a spammer or some other non-authentic entity.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module may or may not modify the information of a signal and may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description, and can be apportioned and ordered in different ways in other embodiments within the scope of the teachings herein. Alternate boundaries and sequences can be defined so long as certain specified functions and relationships are appropriately performed/present. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. Although the Internet is taught herein, the Internet may be configured in one of many different manners, may contain many different types of equipment in different configurations, and may replaced or augmented with any network or communication protocol of any kind. Furthermore, client devices are often taught and depicted herein as laptop computers or personal computers (PCs), however, client devices can be cell phones, smart phones, palmtop computers, laptop computers, netbooks, mobile internet devices, point of sale devices, GPS systems, appliances, home security systems, DTVs, set top boxes, portable or fixed game consoles, workstations, supercomputers, other servers, personal device assistants (PDAs), or any other electronic device used by an end user.

One of average skill in the art will also recognize that the functional building blocks, and other illustrative blocks, modules and components herein, can be implemented as illustrated or by discrete components, application specific integrated circuits, processors executing appropriate software and the like or any combination thereof. The search results herein are taught as business, organizations, partnerships, stores, etc. It is important to not that when these terms are used, they can mean an individual (e.g., hairdresser, doctor, etc.), partnerships, incorporated business, government entity, foreign corporation, or any other form for conducting business, selling products, or providing services. Furthermore, the order of claimed steps and steps in methods may be changed. For example, it is largely taught herein that certain decision boxes are decided in a certain order in FIGS. 8 and 9. There is nothing preventing this decision box process from being done in another order, and still work to perform the expected algorithms.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

What is claimed is:

1. A search engine server that facilitates searching on the Internet, the search engine server comprising:
   memory;
   a processor operably coupled to the memory, the processor to implement:
   an aggregate whois database including a first database containing a first category of website addresses and a second database containing a second category of website addresses;
   a reverse index database containing addresses of websites;
   a whois analyzer having access to the aggregate whois database and the reverse index database for analyzing the contents of the aggregate whois database and reverse index database; and
   wherein the whois analyzer correlates the addresses from the first database included in the aggregate whois database and the addresses from the reverse index database to identify uncorrelated domain names, and then monitors the uncorrelated domain names to enable corrective action over time.

2. The search engine server of claim 1, wherein the aggregate whois database is an aggregation of a plurality of whois databases from whois database servers communicatively coupled to the search engine server.

3. The search engine server of claim 1, wherein the aggregate whois database further comprising a plurality of records wherein each record in the plurality of records is related to a registered business firm.

4. The search engine server of claim 1, the processor further adapted to implement:
   a whois crawler that crawls through a plurality of whois database servers; and
   wherein the whois crawler extracts at least portions of whois information records from a plurality of whois database servers into the aggregate whois database that is accessible by the search engine server.

5. The search engine server of claim 1 wherein the addresses are Internet URLs and the whois analyzer correlates URLs from the first database included in the aggregate whois database and the reverse index database and extracts the uncorrelated URLs into an uncorrelated URL database for further action.

6. The search engine server of claim 5 wherein the further action further comprises an action selected from the group consisting of:
   the removal of those URLs from the search result list during subsequent search operations;

the search engine server removing the URLs from the reverse index database; and the search engine server triggering further actions.

7. The search engine server of claim 6 wherein the search engine server triggers further actions comprising the search engine being instructed to stop crawling various domains from where the uncorrelated URLs are being crawled.

8. The search engine server of claim 7 wherein the step of the search engine stopping the crawling of the various domains from where the uncorrelated URL is being crawled comprises triggering a corrective action by the domain registration system administrator to call a business firm of the respective URLs to begin corrective measures with the business firm.

\* \* \* \* \*